US008112503B2

(12) United States Patent
Sekimoto et al.

(10) Patent No.: US 8,112,503 B2
(45) Date of Patent: Feb. 7, 2012

(54) CONTENT DELIVERY METHOD, SERVER, AND TERMINAL

(75) Inventors: Nobuhiro Sekimoto, Tachikawa (JP); Akira Date, Kunitachi (JP); Ui Yamaguchi, Toyota (JP); Hiroki Miyamoto, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 170 days.

(21) Appl. No.: 12/324,939

(22) Filed: Nov. 28, 2008

(65) Prior Publication Data

US 2009/0138576 A1 May 28, 2009

(30) Foreign Application Priority Data

Nov. 28, 2007 (JP) ................................ 2007-306751

(51) Int. Cl.
*G06F 15/16* (2006.01)

(52) U.S. Cl. ........ 709/219; 709/206; 709/217; 709/222; 358/1.15

(58) Field of Classification Search ................. 709/219, 709/206, 217, 222; 358/1.15
See application file for complete search history.

(56) References Cited

U.S. PATENT DOCUMENTS

| | | | | |
|---|---|---|---|---|
| 7,305,375 | B2* | 12/2007 | Cioccarelli | ............. 707/999.001 |
| 7,653,689 | B1* | 1/2010 | Champagne et al. | ......... 709/206 |
| 2002/0046232 | A1* | 4/2002 | Adams et al. | ................. 709/200 |
| 2004/0264471 | A1* | 12/2004 | Boulay et al. | .............. 370/395.2 |
| 2005/0021665 | A1* | 1/2005 | Sekimoto et al. | ............. 709/217 |
| 2005/0099651 | A1* | 5/2005 | Kimura et al. | ................ 358/1.15 |
| 2005/0198238 | A1* | 9/2005 | Sim et al. | ....................... 709/222 |
| 2006/0059248 | A1* | 3/2006 | Ikeda | ............................ 709/219 |
| 2006/0212542 | A1* | 9/2006 | Fang et al. | ..................... 709/219 |
| 2007/0156847 | A1* | 7/2007 | Berkvens | ..................... 709/219 |
| 2008/0250239 | A1* | 10/2008 | Risan et al. | .................... 713/153 |

FOREIGN PATENT DOCUMENTS

| | | |
|---|---|---|
| CN | 101026741 A | 8/2007 |
| JP | 2005-135140 | 5/2005 |
| JP | 2006-72432 | 3/2006 |
| WO | WO 2007067176 A2 | 6/2007 |

OTHER PUBLICATIONS

Chinese Office Action (Notice of First Examination Contents), dispatch date May 3, 2011 (Chinese Patent Application No. 2008101815521), including English-language translation of items 3, 4 thereof.

* cited by examiner

*Primary Examiner* — Yves Dalencourt
*Assistant Examiner* — Michael C Lai
(74) *Attorney, Agent, or Firm* — Brundidge & Stanger, P.C.

(57) ABSTRACT

In hybrid peer-to-peer type content delivery, a server confirms user's intension as to content disclosure, guarantees content delivery by mutual authentication between a client to which content has been delivered and a client to which content has not been delivered, and guarantees the integrity of content having been delivered. Further, the server configures delivery connection based on the network relationship between the clients and priority factors taking account of a reservation status.

10 Claims, 15 Drawing Sheets

FIG. 2

| CLIENT ID | CLIENT EQUIPMENT IDENTIFIER | OWNER | RESIDENCE | CONTACT ADDRESS |
|---|---|---|---|---|
| 000001 | 012F1A6... | ICHIRO TANAKA | TOKYO 123-4567 ... | ichiro@aa.bb.or.jp |
| 000002 | B6BC6DD ... | TADASHI SUZUKI | KANAGAWA 234-5678 ... | tadachan@opq.or.jp |
| 000003 | B5EE0041... | HANAKO SATO | SAITAMA 345-6789 ... | hana-boo@hoge.gr.jp |
| ... | ... | ... | ... | ... |

| CLIENT ID | ADDRESS | PORT | ROUTE | LINE SPEED |
|---|---|---|---|---|
| 000001 | 123.45.67.8 | 8080 | yellow-3.bb.or.jp<br>→gate.bb.or.jp<br>→route110.bb.or.jp<br>→abc-102.tohoho.or.jp<br>→yohoho-2.fast.or.jp | UPWARD = 53 Mbps,<br>DOWNWARD = 8.5 Mbps |
| 000002 | 45.123.99.11 | 80 | tadachan-gate.opq.or.jp<br>→service.foo.co.jp<br>→unknown<br>→unknown<br>→yahoho-4.fast-net.or.jp | UPWARD = 36 Mbps,<br>DOWNWARD = 5.2 Mbps |
| 000003 | 1.23.23.23 | 8080 | sasa.hoge.or.jp<br>→door.hoge.or.jp<br>→route123.bb.or.jp<br>→abc-102.tohoho.or.jp<br>→yohoho-2.fast.or.jp | UPWARD = 13 Mbps,<br>DOWNWARD = 2.4 Mbps |
| ... | ... | ... | ... | ... |

| CLIENT ID | PAYMENT METHOD | USER NAME | DELIVERED CONTENT | CHARGE |
|---|---|---|---|---|
| 000001 | CREDIT CARD 1234-5678-9012-1111 | ICHIRO TANAKA | 1000001 1023012 1536257 1884523 | -1,200 |
| 000002 | BANK ACCOUNT xxBANK - SAVINGS ACCOUNT 1212121 | TADASHI SUZUKI | 1000001 1845539 1088114 1455523 | -980 |
| 000003 | CREDIT CARD 5678-9012-1234-2222 | HANAKO SATO | 1231225 1848963 | -2200 |
| ... | ... | ... | ... | ... |

| CONTENT ID | FORMAT | SUBSTANCE | CONTENT DATA | SIZE | CHECK SUM | PLAY KEY | FEE |
|---|---|---|---|---|---|---|---|
| 1000001 | MPEG-2/ AAC/ 1920×1080 | TITLE: DUEL IN MIDSUMMER STARRING: DERUKA SAGA, ETC. GENRE: FILM (JAPANESE)... | 001010011... | 11.324.134 | 3F | AA111 BBCC 6780 ... | 300 |
| 1000002 | MPEG-2/ AAC/ 1920×1080 | TITLE: SURE WAY TO WIN IN PACHINKO-SLOT MACHINE (1) STARRING: PACHI PACHI GAL, ETC. GENRE: PASTIME... | 001101101... | 7.362.992 | 99 | AABA 3434C FF00 ... | 1,500 |
| 1000003 | H.264/ AAC/ 1920×1080 | TITLE: Spar Wars Ep.1 STARRING: MARK FORD, ETC. GENRE: FILM (FOREIGN)... | 011011110... | 2.334.349 | B0 | AAC6 9D320 8901 ... | 600 |
| ... | ... | ... | ... | ... | ... | ... | ... |

| CONTENT ID | SERVED CLIENT ID |
|---|---|
| 1000001 | 000001,000002,003020.... |
| 1000002 | 000105,000203,000211... |
| 1000003 | 000011,002345,005050.... |
| ⋮ | ⋮ |

FIG.7

| CONTENT ID | CLIENT EQUIPMENT ID |
|---|---|
| 1000003 | 85EE0041... |

FIG. 11

| TITLE | SUBSTANCE | FEE | DELIVERY |
|---|---|---|---|
| | DELIVERY SERVICE | | |
| DUEL IN MIDSUMMER | STARRING: DERUKA SAGA, ETC. GENRE: FILM (JAPANESE) | ·300 | ✓ |
| SURE WAY TO WIN IN PACHINKO-SLOT MACHINE (1) | STARRING: PACHI PACHI GAL, ETC. GENRE: PASTIME | ·1,500 | |
| Spar Waes Ep.1 | STARRING: MARK FORD, ETC. GENRE: FILM (FOREIGN) | ·600 | |

FIG.13

| RANK | CLIENT ID | PRIORITY FACTOR |
|---|---|---|
| 1 | 1000001 | 0.825 |
| 2 | 1002552 | 0.627 |
| 3 | 1000002 | 0.114 |
| ⋮ | ⋮ | ⋮ |

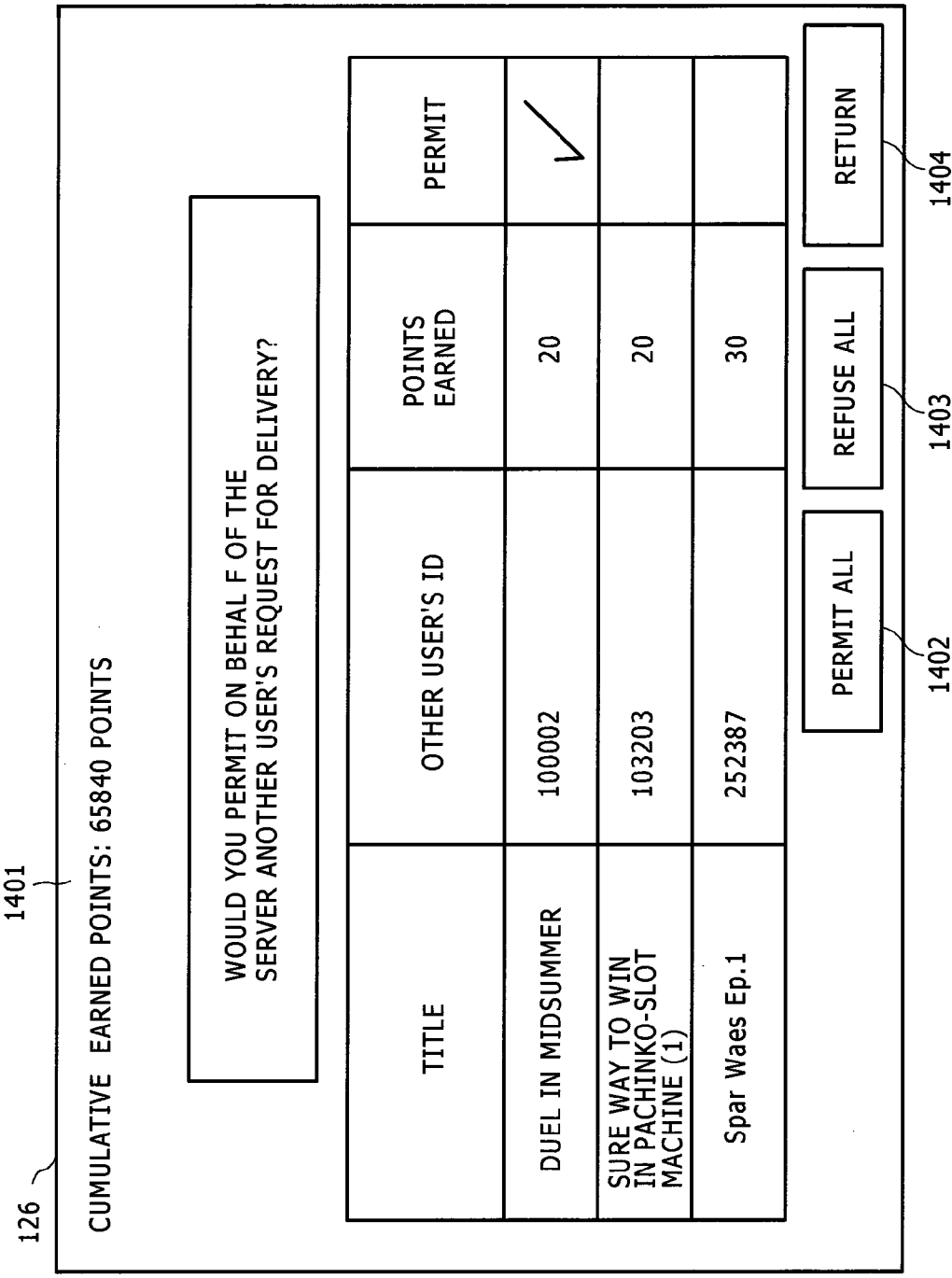

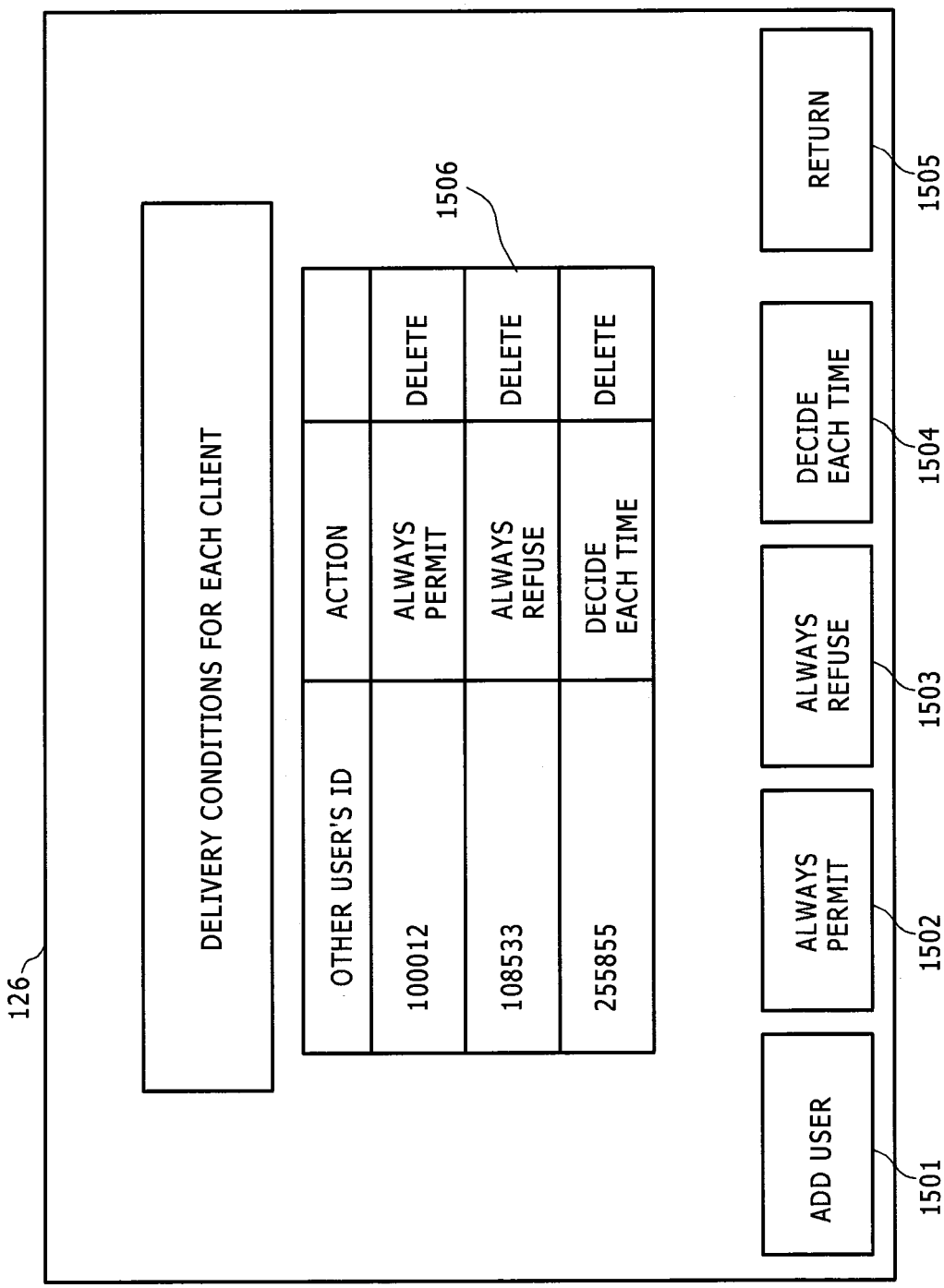

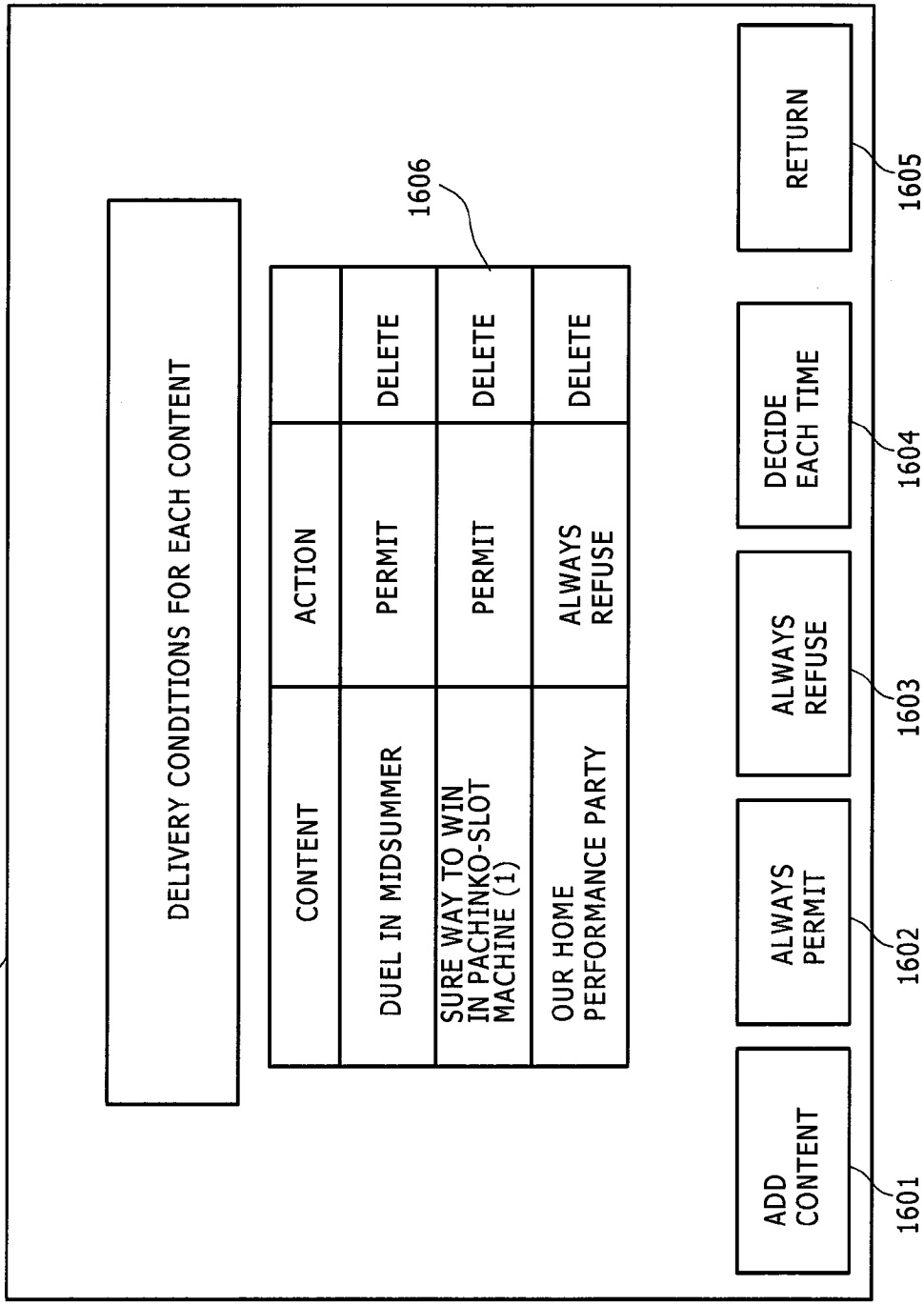

CONTENT DELIVERY METHOD, SERVER, AND TERMINAL

CLAIM OF PRIORITY

The present application claims priority from Japanese patent application serial No. 2007-306751, filed on Nov. 28, 2007, the content of which is hereby incorporated by reference into this application.

BACKGROUND OF THE INVENTION (1) Field of the Invention

The present invention relates to delivery of contents via a network.

(2) Description of the Related Arts

Along with the improvement of terminal performance and the capacity increases of network lines and of hard disks, in recent years, content delivery systems have been made up. The content delivery systems deliver contents, including such kinds of data as image, video, audio, text, program, and explanatory information (meta-data), from a server to client terminals over an Internet Protocol (IP) network, thereby to enable users to watch and listen to the received contents at their terminals. IP television (IPTV) service for delivering such audiovisual works as television programs and movies by using this kind of content delivery has been developed.

Japanese unexamined patent publication No. 2005-135140 (Patent document 1) discloses an invention to accomplish an object of providing a technique with which a client who requested content can receive requested content delivery from a specific client having superior delivery quality and licensing conditions (See, paragraph [0012] of the Patent document 1) by sending from a server to the requesting client a list of clients to which the requesting client is connectable, so that the requesting client can select the optimum one in accordance with the delivery quality and licensing conditions out of the listed clients and receive content delivery from the selected client (See, paragraph [0013] of the Patent document 1).

Japanese unexamined patent publication No. 2006-72432 (Patent document 2) discloses an invention to accomplish an object of providing a peer-to-peer type content delivery system capable of balancing loads on the participating piers by providing a large number of dynamic peers DP and a center server CS for managing content delivery. Each dynamic peer DP notifies the center server CS of its own operating state, and the center server CS calculates and registers the load on each dynamic peer DP on the basis of the notified operating state. Each dynamic peer DP obtains a list of contents from the center server CS to search for the other dynamic peers DP each having the content it desires, and downloads the content from the least loaded dynamic peer DP. The system is further provided with a static peer SP for uploading a new content first. The content is delivered to dynamic peers DPs starting from the static peer SP (See, abstract of Patent document 2).

IPTV service is broadly classified into three types of service: streaming, download and progressive download.

In the streaming, a server delivers content data successively to a client, and the client represents video and audio from arrived data to present them to its user. This enables the user to watch and listen to the content on a substantially real time basis if a network has a sufficiently wide bandwidth.

In download, the client acquires all the content data from the server in advance, and starts representing of the content data for watching and listening after completing the storing of received content data. Because all the content data are delivered and stored in advance, the download type service enables the user to watch and listen to the content whenever and as many times as the user wants in the case where there is no need to watch and listen on a real time basis and to receive content delivery even if the network does not have a wide enough bandwidth.

Progressive download is positioning between the streaming type and the download type. In the progressive download, watching and listening of content are performed successively from content data having been stored in the terminal before completing the delivery of all the contents. The progressive download has an advantage that the user does not have to wait for the completion of all content data storing, the time for storing the content data is shortened substantially even if the bandwidth is not wide enough and the user can watch and listen to the content whenever and as many times as the user wants after completing the content data storing.

Commercial IPTV services, especially download-oriented services, are usually provided by a so-called server-client type system in which contents are distributed from a center server. In this system, content delivery is started when a user designates a desired content from among content lists offered by the center server.

In this system, for example, a part of the title, a text indicating the name of performer, genre attributes of the content, etc. that are designated by the user, are sent to the server. The server searches for the desired content by using the function of narrowing down the possible candidates according to a suitable content list.

As the content service provider has to take charge of many administrative processing, such as authentication of a terminal and a user that receive the content delivery as legitimate equipment and an authorized subscriber, charge accounting for each user who has contracted the content delivery service to play the content, managing the key information for enciphering content data and decrypting encrypted data to prevent unfair watching/listening of the content, etc., the server-client type is generally considered suitable for the content delivery service described above.

On the other hand, there is a peer-to-peer (P2P) type delivery as one of file sharing type delivery for delivering general contents by using PCs and the Internet. In this type of delivery, a terminal which is referred to as a peer or a client operates as a server to another terminal, and contents are delivered from one terminal to another terminal, namely from peer to peer. In this type, content delivery takes place in geometrical progression as a plurality of terminals perform successively the role of the server, unlike in the client-server type delivery in which a specified server carries out all the content delivery.

P2P type delivery is classified into a pure P2P type and a hybrid P2P type. In the pure P2P type, since every communication is carried out basically by peers with no dependence on the center server, the network has high tolerance to faults. It is also characterized by the capability to permit anonymity in mounting and a high efficiency of delivery.

Meanwhile, in the hybrid P2P type, content forwarding is carried out between peers, but resolution of content location and assignment of peers are carried out by the center server. That is, as the searching of content and peer having the content is performed by the center server and actual content delivery which needs a heavy processing load is carried out by peers, the hybrid P2P is a rational content delivery method permitting easy management of all terminal operations.

In considering these factors, techniques for spreading the IPTV service offering managed content delivery have been developed in the IPTV download delivery service as well by using a P2P type content delivery method, especially, by using a hybrid P2P type content delivery method.

For instance, in a hybrid P2P type contents delivery system according to Patent document 1, each peer is available content redelivery from a peer having good delivery quality and adequate licensing conditions with a long validity period. This type ensures stable delivery quality and licensing conditions because each client can receive content delivery from a peer having the best connection environment from among a plurality of peers.

According to Patent document 2, P2P type content delivery is realized by making each peer notify the center server of its own operation state so that the center server can select the least loaded peer.

SUMMARY OF THE INVENTION

Patent document 1 and Patent document 2 disclose, as peer selecting means, to use delivery quality of a network and licensing conditions or the state of peer load, and delivery procedures using them.

However, in these Patent documents, a redelivery peer is selected based on the network traffic or the load of the apparatus, and neither discloses anything about the legitimacy and the safety of the content and the peer or about how to assure the legitimacy and the safety of the content.

Since P2P type content delivery can deliver contents easily, however, it involves the problems of delivering contents without respecting the copyright of its producer, allowing evil data such as computer viruses to cause adverse impacts on a terminal and inviting illegitimate accessing to the terminal or an outflow of confidential data from the terminal while a user was unaware of them. Therefore, it is indispensable to solve these problems before expanding the use of IPTV services.

Especially in commercial IPTV services, many of users have no sufficient technical knowledge about a communication network, content delivery services and the construction of terminal for enjoying such delivery services.

Accordingly, it is an object of the invention to ensure adequate safety for the use of contents from service provider side.

It is another object of the invention to ensure the integrity of contents delivered to each user who purchased the right to watch and listen to the contents.

According to one aspect of the present invention, content delivery request information for requesting content delivery is transmitted from a terminal to a server, the server having received the content delivery request information from the terminal transmits to the terminal, a redirect instruction for instructing the terminal to transmit the content delivery request information to another terminal. Upon receiving the redirect instruction from the server, the terminal transmits to the other terminal, the content delivery request information, and the other terminal having received the content delivery request information delivers the content to the requesting terminal.

According to this method, it is able to realize safer content delivery. For instance, in the case of IPTV using a hybrid P2P type content delivery system, security and safety against problems regarding content delivery service is ensured for each user at a high level. From the standpoints of content producers and server operators, it is possible to reduce the risk of circulation of illegitimate contents. Furthermore, by rationally setting delivery peers to be connected, high speed content delivery and content delivery taking account of the state of terminal use can be realized.

BRIEF DESCRIPTION OF THE DRAWINGS

FIG. 2 shows an example of authentication information 101;

FIG. 3 shows an example of communication information 102;

FIG. 4 shows an example of account information 104;

FIG. 5 shows an example of content information 105;

FIG. 6 shows an example of content-possessing client information 109;

FIG. 7 shows an example of identifiers 121 and 141 which clients have;

FIG. 11 shows an example of display screen for content selection;

FIG. 13 shows an example of priority list of served clients;

FIG. 14 shows an example of display screen (collective display) for proxy delivery acceptance;

FIG. 15 shows an example of conditions regarding clients for proxy delivery; and FIG. 16 shows an example of conditions regarding contents for proxy delivery.

DETAILED DESCRIPTION OF PREFERRED EMBODIMENTS

Preferred embodiments will be described with reference to the accompanying drawings. However, the application of the invention is not limited to these embodiments. In describing the invention, contents are supposed to be program information composed of plural kinds of media including image, video, audio, text information, programs, etc.

Figure 1:
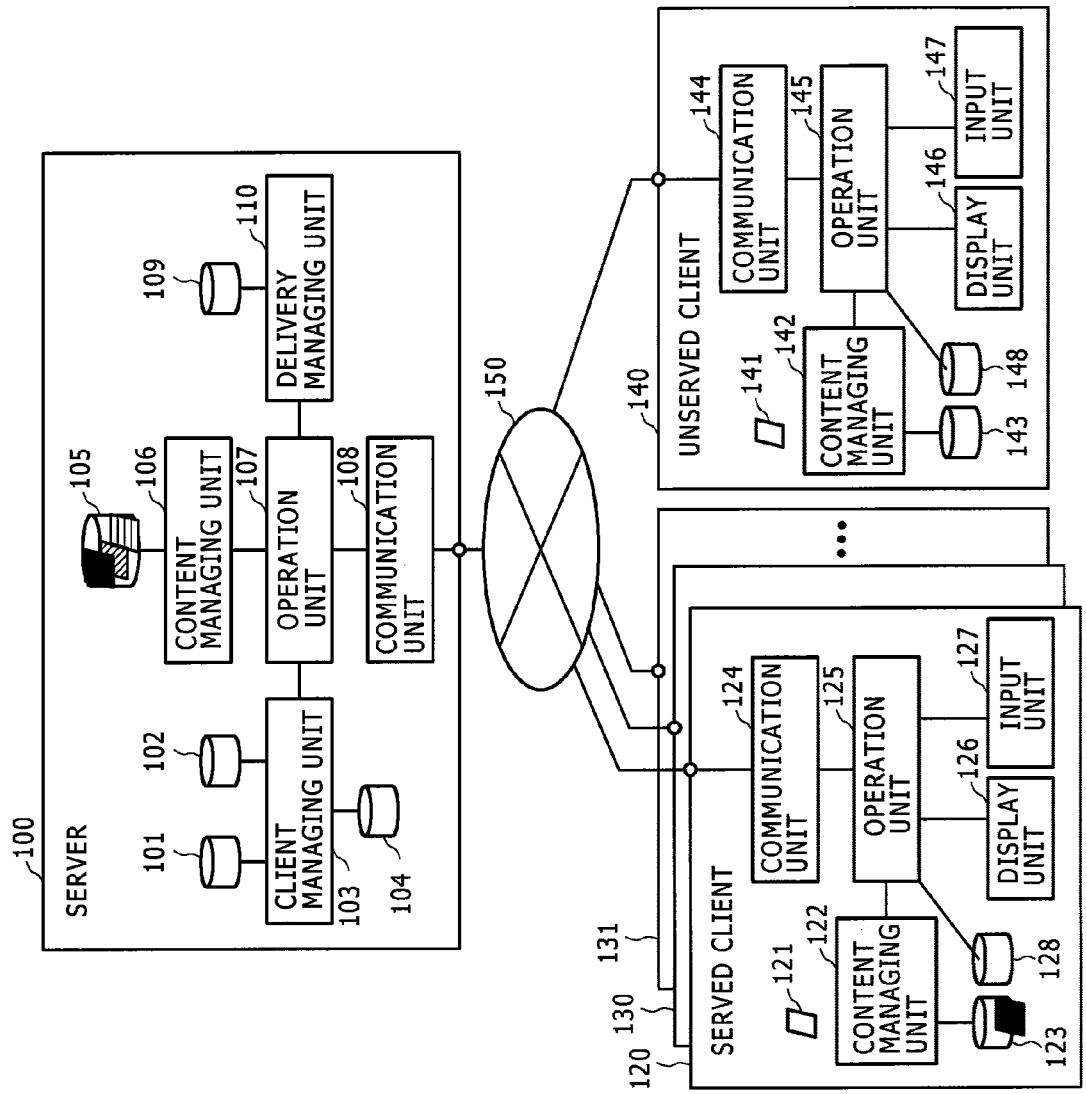
FIG. 1 shows an example of system configuration.

FIG. 1 shows a basic system configuration for implementing the invention. A server 100 and clients 120, 130, 131 and 140 are connected to the Internet 150 at the center.

The server 100 includes, centering on an operation unit 107, a communication unit 108 for communication with other equipment, especially clients, by using a network, a client managing unit 103 for managing clients, a content managing unit 106 for managing contents and a delivery managing unit 110 for managing the state of delivery.

The client managing unit 103 manages authentication information 101 for authenticating clients, communication information 102 indicating the state of communication with clients and account information 104 indicating the state of charge for each content.

FIG. 2 illustrates one example of authentication information 101 on clients. The authentication information indicates the client ID (client management number) of each client, a client equipment identifier unique to each client, and the owner of the client equipment together with the owner's residence and contact address.

FIG. 3 illustrates one example of communication information 102. The communication information indicates, in association with the client ID, the address and the network port of each client, route information and line speed determined on previous communication of the client with the server.

In the processing described hereinafter, the server communication with each client by using these addresses and port number. Route information is detected by using common commands for detecting a router on the route, such as "tracert". The line speed can be calculated as an average from the transmitted or received data size in communication between the client and the server and the time taken by that transmission or reception.

Although this description supposes the forms of Internet Protocol Version 4 (IPv4), some other form, such as IPv6 or telephone lines, may be used as well.

FIG. 4 illustrates one example of account information 104. The account information indicates, in association with the client ID, payment method, a user name, IDs of delivered contents and the charge to be billed to the owner of the client for receiving content delivery service or playing, watching and listening to the delivered content. These categories of information managed by the client managing unit 103 may be recorded on a medium such as a hard disk and read out into a memory managed by the client managing unit.

The content managing unit 106 manages content information 105 including content data and other information associated with the content data. FIG. 5 illustrates the content information 105. The content information comprises the content ID, explanatory information for indicating including the format and substance of each content, content data, content size and check sum to be used for guaranteeing the integrity of the content, key information for decrypting and playing the content enciphered by using RSA encrypting technique or the like to protect the content from any malicious third party on communication paths including the Internet, and a fee to be charged for receiving content delivery service or playing, watching and listening to the delivered content. The content information 105 can be considered as a storage unit for accumulating the content data.

These categories of information may be recorded on a medium such as a hard disk and read out into a memory managed by the content managing unit 106. Also, they may be managed in separate groups as content data and the other data for explaining the content data (meta-data). Further, the server for possessing the content data and the server for possessing content information on the content data may as well be different servers. Thus, the server 100 may be a server for possessing no content data and managing content delivery by using content information on the content data in the way to be described afterwards.

The delivery managing unit 110 manages content-possessing client information 109 regarding clients to which content delivery has been already done. FIG. 6 illustrates the content-possessing client information 109. The content-possessing client information includes, in association with the content ID, served client IDs indicating clients to which the content with the content ID has already been delivered.

Next, clients 120, 130, 131 and 140 will be described. The clients in the context of the invention will be separated in description into served clients 120, 130 and 131 and an unserved client 140. However, since each client operates as a servelet which functions both as a client and as a server in P2P type delivery, each client can operates as an unserved client regarding one content, but as a served client regarding the other content.

Although every client is supposed to have the same block configuration in the following description, the configuration does not need to be the same for all clients if each client can perform the processing steps described below. For instance, a client may be configured as a general purpose device such as a PC or a specific device such as a TV set.

The served client 120, which also represents 130 and 131 for the sake of convenience of description, includes, centering on an operation unit 125, an identifier 121 preset to identify the client equipment, a communication unit 124 for communication with other equipment through a network, a content managing unit 122 for managing contents, a display unit 126 for performing display for the user, an input unit 127 for receiving instructions from the user, and a setting unit 128 for the client.

Similarly, the unserved client 140 includes an operation unit 145, an identifier 141, a communication unit 144, a content managing unit 142, a display unit 146, an input unit 147 and a setting unit 148 for the client. The display unit does not need to be a display that is unified with the client equipment, but may be an output unit for outputting data to be displayed on a display device separate from the client equipment.

The content managing units 122 and 142 of the respective clients manage content information 123 and 143. These sets of content information are in the same form as the content information 105 in the server as shown in FIG. 5, and various information items regarding contents having been already delivered to the respective clients are managed.

FIG. 7 illustrates the client equipment identifiers 121 and 141 assigned to each client equipment. The client equipment identifiers are symbol strings to warrant the uniqueness of each client by a predetermined formula, and may be held in association with the IDs of clients as illustrated.

Figure 8:
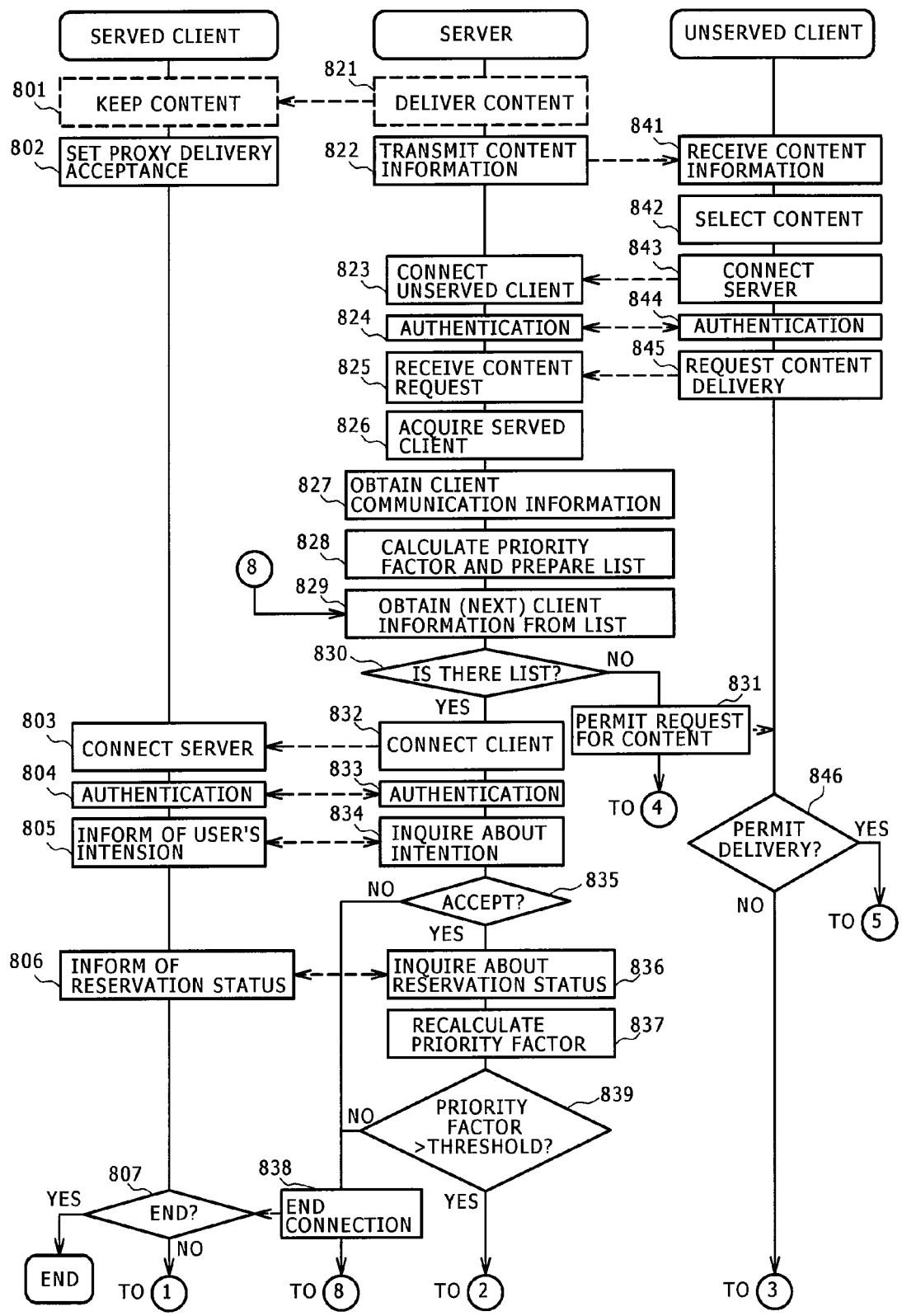
FIG. 8 shows an example of processing flow by a server, a served client and an unserved client.
Figure 9:
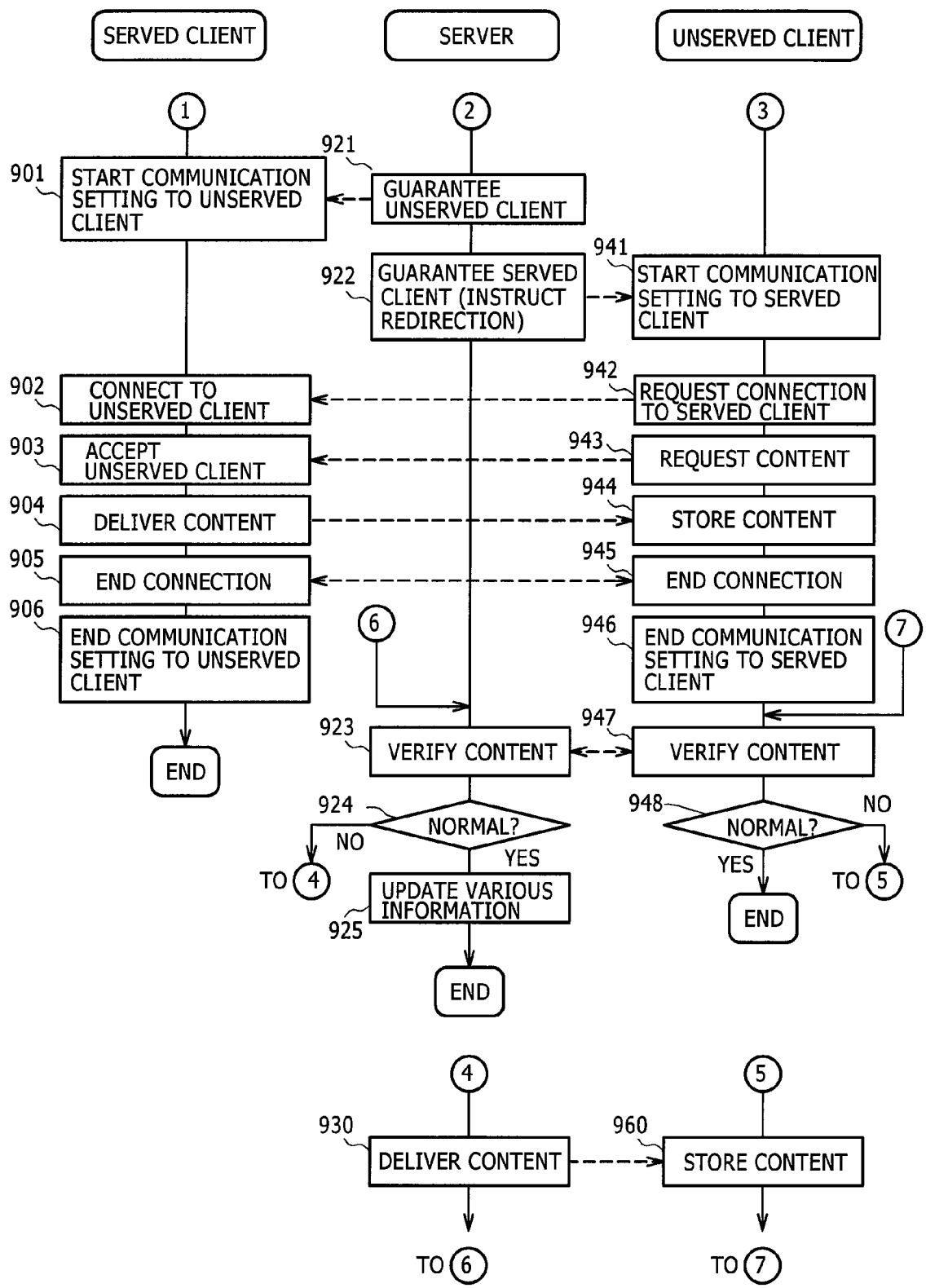
FIG. 9 shows an example of processing flow by the server, the served client and the unserved client (continued)

Next, operations at the server 100, the served clients 120, 130 and 131, and the unserved client 140 will be described. FIG. 8 and FIG. 9 illustrate processing flows in the server 100, the served clients 120, 130 and 131, and the unserved client 140. The flows will be described below in a time sequence. Each step of processing is supposed to be mainly executed by the operation unit of the server or the client in coordination with other units connected thereto. For communication, both the server and the clients use the communication unit 108, and communication is carried out via the Internet, but detailed description of this aspect will be neglected for the sake of convenience.

Figure 10:
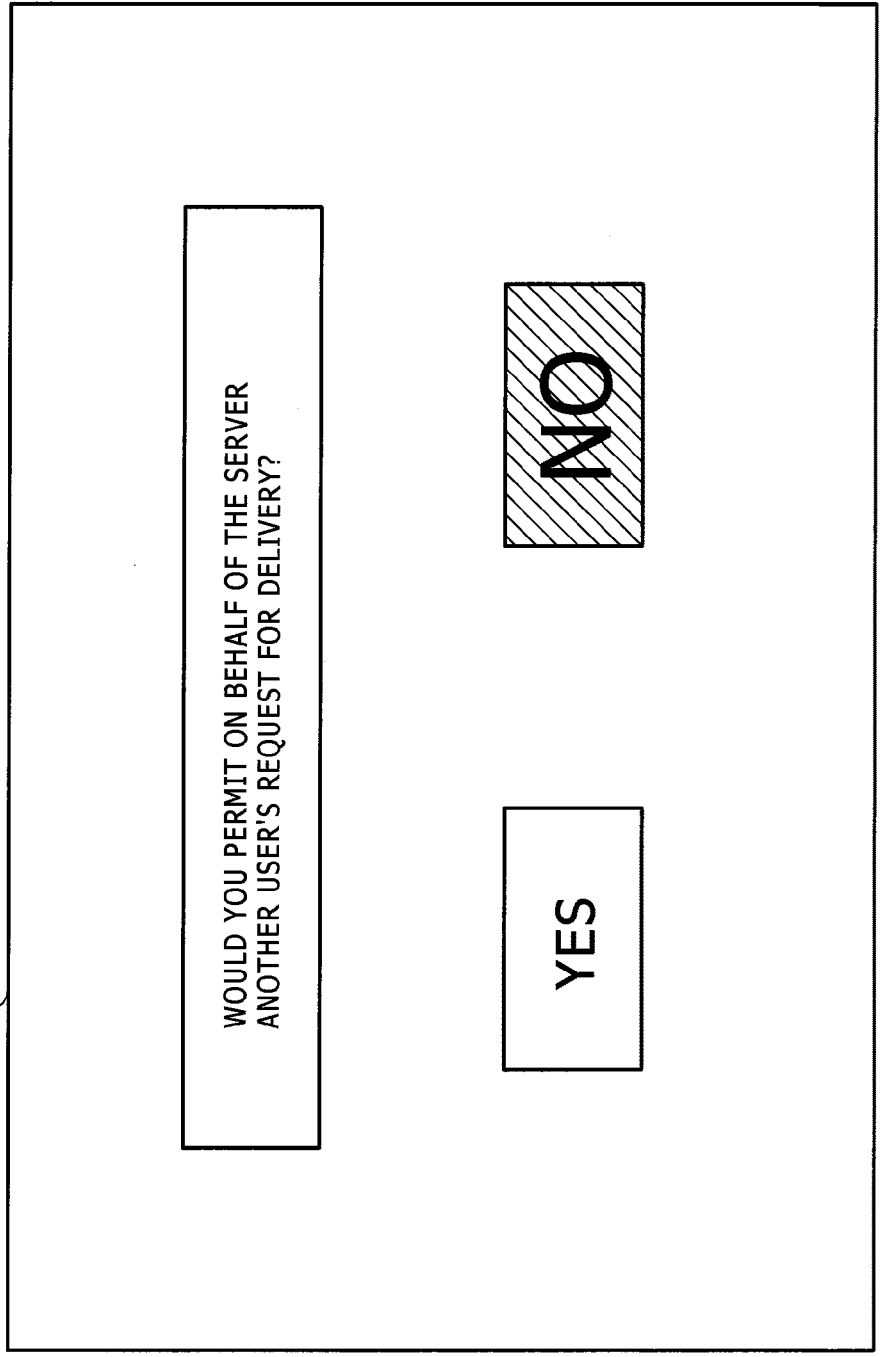
FIG. 10 shows an example of display screen for proxy delivery acceptance.

First, a served client keeps a content (step 801) delivered from the server (step 821). The served client sets proxy delivery acceptance to ascertain the user's will as to whether perform delivery as proxy for the server in P2P type delivery according to the invention (step 802). FIG. 10 shows an example of display screen displayed for the proxy delivery acceptance. By outputting such a screen as illustrated to the display unit 126 of the served client in order to ask the user whether a request for performing content delivery on behalf of the server is acceptable from another user (the user of an unserved client), an instruction is received from the input unit 127, which may be a remote controller, an operation panel, a mouse or the like. The result of the setting of proxy delivery acceptance is recorded in the client setting unit 128.

Next, content delivery will be described. First, the server 100 transmits deliverable content information items, for instance, the title and description of the substance of the content and the names of performers, excepting some items such as key information and check sum out of the content information 105, to the unserved client 140 (steps 822 and 841).

By using the display unit 146 and the input unit 147 the user of unserved client selects, on the basis of the delivered content information, the content desired by the user out of the contents deliverable from the server (step 842). FIG. 11 shows an example of display screen for content selection. Substantial items necessary for the user which are extracted out of the delivered content information are displayed so that the user selects one of contents that the user desires to be delivered by checking the content (step 842).

Instead of displaying all the contents to enable the user to make choice, narrow-down search by the genre or keywords may be allowed. This content search may be carried out by the server so that the searching result is transmitted from the server to the client. Although FIG. 11 supposes that content selection is made by checking the content to be delivered, this is not the only available way of expressing the choice, but content selection can also be made by some other methods, such as changing the color in which the selected content is displayed.

Next, in order to notify the server of the ID of selected content, content ID "100001" in the case of FIG. 11, a connection to the server is established (steps 843 and 823), and the client is authenticated (steps 824 and 844). If the client fails authentication at steps 824 and 844, the processing may be ended here because the client concerned cannot receive delivery service. In this case, the server may restrict available delivery service, for example, by changing the service condition so as to deliver contents inferior in resolution. A specific content may be delivered to display guidance in order to prompt subscription or registration with the server as a regular client and a regular user eligible for authentication.

In the authentication, the identifier 141 of the unserved client is transmitted to the server, the client managing unit collates the received identifier with the authentication information 101 and sends the result of authentication to the unserved client. The authenticated unserved client then transmits a content request to the server by using the content ID (steps 845 and 825).

In the server, the delivery managing unit obtains a client ID corresponding to the content from the content-possessing client information 109 (step 826), and the client managing unit 103 obtains corresponding communication information from the communication information 102 on the basis of the client ID (step 827). On this occasion, information regarding unserved clients is also obtained.

Next, a priority factor of the client is calculated based on the communication information obtained on each served client and the clients are arranged in the descending order of the priority factor (step 828).

Figure 12:
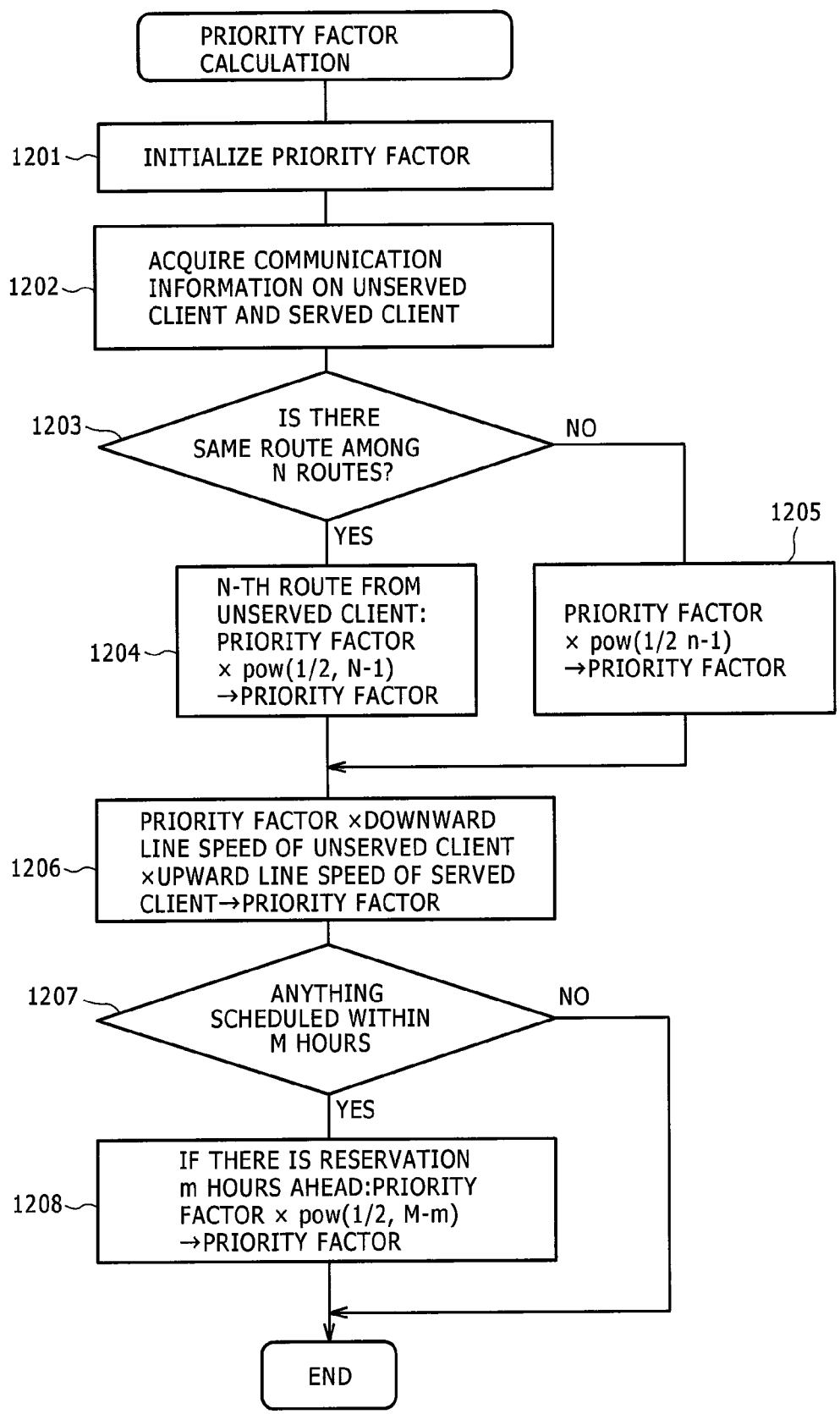
FIG. 12 shows an example of priority factor calculation flow.

Here, calculation of priority factors will be described. FIG. 12 shows the flow of priority factor calculation. First, the priority factor is initialized (step 1201), and communication information on an unserved client and a pertinent one of the served client is obtained.

Of the N routes (N is a predetermined constant) for the unserved client, the n-th route and the served clients' routes are compared (step 1203). If the same route is included (Yes at step 1203), the priority factor is multiplied by the n-th power of ½ (step 1204). Thus, the priority factor is multiplied by ½ every time the number of route increases by one between the unserved client and the served client.

If there is no route duplication among the N routes (No at step 1203), the priority factor is multiplied by the N-th power of ½ (step 1205). In order to assess the speed on the line toward the unserved client, the priority factor is multiplied by the speed on the downward line of the unserved client and the speed on the upward line of the pertinent served client (step 1206).

It is also assessed for a later acquisition whether reservation is already made for recording, watching/listening, delivery or the like, that are scheduled for the pertinent served client in M hours (M is a predefined constant) from now (step 1207). If there is a reservation within m hours (Yes at step 1207), the priority factor is multiplied by the (M-m)-th power of ½ (step 1208).

That is, any reservation in the immediate future is taken into account in the calculation so as to lower the priority factor. If no schedule is set or no reservation is made for the M-hour period from now (No at step 1207), no manipulation of the priority factor on account of a reservation is made.

In this way, the priority factor is figured out for all the served clients that have been acquired, and a list is prepared in the descending order of the priority factor (step 828). FIG. 13 shows an example of priority list of served clients. By listing them in the descending order with the calculated priority factor being used as the key, the served clients are assessed in a more rational order from the viewpoint of network architecture when the following steps are executed.

Referring back to FIG. 8, description of the rest of the flow will be resumed. One served client is selected in the order of priority factors (step 829) and negotiations are started. If it is found that there is no list or no appropriate proxy server exists as a result of continuing negotiations to the last minute reveal (No at step 830), the server delivers the content to an unserved client (steps 831 and 846, and steps 930 and 960 in FIG. 9).

The negotiations in this context means an attempt to establish connection to a client via a network, or making a judgment not to establish connection to this client after comparing its priority factor with priority factors of the other clients listed thereafter in the list when there are differences among various sets of information detectable by connection at that moment and used in the priority factor calculation and the result of priority factor recalculation gives a lower priority factor than the previous one, or the like. The pertinent client information may be updated on this occasion according to a newly obtained variety of information.

If a served client is found available from the list (Yes at step 830), an attempt is made to establish connection from the server to the served client (steps 832 and 803).

In order to carry out authentication after the establishment of connection, the client managing unit 103 makes collation by using the served client's identifier 121 and the server's authentication information 101, and sends the result to the served client (steps 804 and 833).

Next, the intention of the user of the unserved client is informed based on the proxy delivery acceptance accomplished as previously stated (steps 834 and 805). If the user has no intention to accept (No at step 835), the attempt to establish connection with this served client is ended (steps 838 and 807), and the object of connection attempt is shifted to the served client having the next priority factor in the list to make a similar assessment (steps 829 through 835).

In place of the setting to confirm the user's intention at step 802 described above, the user's intention may be inputted at step 805. In this case, the user's intention may be confirmed by displaying either the screen shown in FIG. 10 or a screen shown in FIG. 14 which indicates a plurality of proxy deliveries requested at the same time. In FIG. 14, the title of the content, the ID of the requesting unserved client and a flag for indicating permission or refusal are displayed for each request.

When the user sets a permission flag by using an input unit, the display state of the flag is changed. A button for simultaneous setting may be provided to make possible Permit All 1402 or Refuse All 1403. In order to prompt the user's proxy delivery acceptance on this occasion, a point-based user incentive scheme may be offered; the number of points may be predefined for each request, and the points are given to each client when the user has accepted to do and actually done a proxy delivery. The cumulative earned points are displayed on a screen 1401 of the display unit 126 to enable the user to check as necessary. The points given to each client may as well be managed by the server. This point-based user incentive scheme may be, for instance, the price for content watching/listening to be discounted at a preset rate, a certain discount to be made on the total charge or a condition for accessibility to some other service.

In the setting of proxy delivery acceptance at step 802, the users' willingness or unwillingness to accept may be set as a precondition so that pertinence can be judged to semi-automate this procedure. For instance, a screen as shown in FIG. 15 can be used to add conditions for each unserved client to perform proxy delivery (1501), and "Always Permit" 1502, "Always Refuse" 1503 or "Decide Each Time" 1504 is set for each client with the pertinent button. On this occasion, the user may set the client ID through the input unit as appropriate. By appropriately providing buttons on the intention-expressing screen as shown in FIG. 10 displayed when a delivery request is received, the user may sift the screen while holding the client ID having made the request.

When "Decide Each Time" 1504 is set, the user is enabled to operate on a screen like the one shown in FIG. 10 when a delivery request is received from the pertinent client. Semiautomatic expression of the intention is made possible by permitting or refusing without going through this procedure 1504 when "Always Permit" 1502 or "Always Refuse" 1503 is set, respectively. Alternatively, a condition may be added for each content on a screen like the one shown in FIG. 16 so as to set "Always Permit" 1602, "Always Refuse" 1603 or "Decide Each Time" 1604. On this occasion, the content or its ID may be set by the user through the input unit as appropriate. By appropriately providing buttons on the intention-expressing screen as shown in FIG. 10 displayed when a delivery request is received, the screen may be shifted while holding the ID of the requested content. When "Decide Each Time" 1604 is set, the user may operate on a screen such as the one shown in FIG. 10 when a delivery request is received from the pertinent client. Semiautomatic expression of the intention is made possible by permitting or refusing without going through this procedure 1604 when "Always Permit" 1602 or "Always Refuse" 1603 is set, respectively.

For the served client of a user who is willing to accept (Yes at step 835), the reservation status until the designated extent is inquired about (steps 835 and 836), a priority factor reflecting the reservation status is recalculated (step 837). This priority factor calculation is carried out according to the flow charted shown in FIG. 12.

If the recalculated priority factor does not exceed a predetermined threshold (No at step 839), the attempt to establish connection with this served client is ended (steps 838 and 807), and the object of connection attempt is shifted to another served client having the next priority factor in the list to make a similar assessment (steps 829 through 835). By repeating the above assessment on every served client in the priority factor list, an appropriate served client is selected. If no appropriate served client is found, the server itself is selected.

If the recalculated priority factor exceeds the predetermined threshold priority factor (Yes at step 839), the pertinent served client is determined as the served client which should carry out the content delivery.

Next, a flow for performing subsequent actual content delivery after determining the served client which should carry out the content delivery will be described with reference to FIG. 9.

Since the unserved client and the served client are already authenticated, communication for guaranteeing the unserved client to the served client is performed (steps 921 and 901). A redirect instruction is transmitted to the unserved client in order to guarantee the served client (steps 922 and 941). The "redirect" means to designate one of served clients as a proxy server for performing content delivery instead of the server.

Through these actions, the served client and the unserved client are mutually guaranteed by the server, and start communication settings to enable them to communicate over a firewall.

Next, a connection request is communicated between the unserved client and the served client (steps 942 and 902). After that, a delivery request of the desired content is transmitted (steps 943 and 903), and content is delivered from the served client to the unserved client. The unserved client stores the received content (steps 904 and 944).

Upon completion of the content delivery, the connection between the two clients is ended (steps 905 and 945), and the communication setting is also ended (steps 906 and 946).

Next, verification to determine whether the content has been correctly delivered will be described. This verification is realized between the unserved client and the server by collating information for verifying the uniqueness and integrity of the content, such as the size and check sum (the value of designated bytes out of the sum of adding up binary data from the beginning) of the content during or after delivery, with data in the content information stored in the server (steps 947 and 923).

For instance, the size of the delivered content is compared with the size of the pertinent content in the content information stored in the server. If the sizes are not found identical, integrity is denied and it may be judged that the content has not been correctly delivered. The criterion of the identity of the content sizes may allow, instead of complete equality, a difference in content size not exceeding a predetermined range to judge an acceptable identity.

Regarding uniqueness, for instance, the check sum of the delivered content is compared with that of the pertinent content in the content information stored in the server. If the check sums are not found identical, uniqueness is denied in the sense that the delivered content and the content indicated by the server's content information are different, and it may be judged that the content has not been correctly delivered.

The information to be used in the collation may be, for instance, parity, hash such as Cyclic Redundancy Check (CRC) of Message Digest Algorithm 5 (MD5) or some other verification technique.

Thus, the uniqueness and integrity of the content are secured, and the user of the unserved client is given a guarantee of the content. After that, account processing which includes updating of the account information 104 is performed by the content managing unit 103 and client managing unit 106 in the server. Whether the charge to the user should be decided when the delivery is completed or when the user plays the content for watching/listening may be selectable arbitrarily.

When it is judged by the above procedure that the content has been correctly delivered (steps 924 and 948), the server updates the various recorded information, such as route information, line speed, etc. between the served client and the unserved client (FIG. 3) that is obtained at the time of connection (step 925), and terminates the processing at both the server and the unserved client.

If it is judged that the content has not been correctly delivered, delivery and storing of content are repeated again (steps 930 and 960) and the processing to ensure the uniqueness and integrity of the content is carried out. The number of times to limit the repeating of content delivery and storing may be designated in advance so that when the repeat number of the delivery reaches the predetermined number of times, the connection route, the status of server and the two clients are checked for any abnormality, thereby to start the delivery and storing of content again after such abnormality has been recovered.

In order to protect from piracy, disguise or the like, the identifier referred to in the foregoing description is desired to be stored under appropriate protection, for example, in the encrypted form or self-destruction form destructible at time of abnormality. The communication performed through the communication units of the server and the client is desirably to use data enciphering in order to achieve mutual trust and protection from external abuse by relying on some other technique such as Secure Socket Layer (SSL).

Although the contents referred to in the description of the invention are supposed to be program information composed of plural kinds of media, such as images, voice and character information, the applicable contents are not limited to them. For example, files to be used in personal computers (PCs), executable object data, e-mails, markup statements and scripts stating operations to be communicated with the World Wide Web (WWW), and general electronic data to be transmitted via networks are applicable as the content. Therefore, the invention can be extensively applicable to many industries using a network.

What is claimed is:

1. A content delivery method for delivering content from a first terminal having the content to a second terminal, the method comprising steps of:
   transmitting content delivery request information for requesting content delivery from said second terminal to a server;
   transmitting to said second terminal, from said server having received the content delivery request information, a redirect instruction for instructing the second terminal to transmit the content delivery request information to said first terminal;
   transmitting the content delivery request information from said second terminal having received the redirect instruction to said first terminal;
   setting whether said first terminal accepts to perform content delivery as proxy for said server, based on a proxy delivery acceptance input from an input unit of said first terminal; and
   if the content delivery as proxy is accepted, delivering the content to said second terminal from said first terminal having received the content delivery request information from said second terminal.

2. The content delivery method according to claim 1, wherein said server verifies whether the content has been correctly delivered to said second terminal.

3. The content delivery method according to claim 1, wherein said server selects said first terminal out of a plurality of terminals.

4. The content delivery method according to claim 3, wherein said server selects said first terminal out of the plurality of terminals on the basis of routes between said second terminal and the plurality of terminals, line speeds of the plurality of terminals and line speed of said second terminal.

5. The content delivery method according to claim 3, wherein said server selects said first terminal out of the plurality of terminals based on the proxy delivery acceptance input from the input unit of said first terminal.

6. The content delivery method according to claim 1, wherein the setting of proxy delivery acceptance in said first terminal is executed before said second terminal transmits the content delivery request information to said first terminal.

7. A server, comprising:
   a communication unit configured to transmit and receive information via a communication line;
   a terminal managing unit configured to manage terminals connected via said communication line;
   a delivery managing unit configured to manage information on terminals to which content has been delivered; and
   an operation unit configured to select, when a content delivery request is received from a first terminal via said communication unit, a second terminal on the basis of information on terminals managed by said delivery managing unit and information on terminals managed by said terminal managing unit, inquire whether proxy delivery of a requested content from said second terminal as proxy for said server is accepted by said second terminal, based on a proxy delivery acceptance input from an input unit of said second terminal, and if said second terminal accepts the proxy delivery, transmit to said first terminal a redirect instruction for instructing the first terminal to transmit the content delivery request to said second terminal.

8. The server according to claim 7, further comprising:
   a content managing unit configured to manage information on content; and a content information storage unit configured to store the information on content;
   wherein said operation unit is further configured to verify whether the content having been delivered from said second terminal to said first terminal is legitimate or safe on the basis of information on the content managed by said content managing unit and stored in the storage unit.

9. A terminal, comprising:
   a communication unit configured to transmit and receive information via a communication line;
   a storage unit configured to store content delivered via said communication line;
   an input unit; and
   an operation unit configured to transmit to a server via said communication unit, information for requesting content delivery; after the requested content is received, set, via said input unit, proxy delivery acceptance to perform delivery of the received content as proxy for said server according to the will of a user of said terminal; receive from the server an instruction to transmit to another terminal the information for requesting content delivery; and transmit to said another terminal the information for requesting content delivery.

10. The terminal according to claim 9, wherein said operation unit is further configured to transmit information for requesting verification as to whether the content having been delivered from said another terminal is legitimate or safe to said server via said communication unit.

* * * * *